United States Patent
Weik et al.

(10) Patent No.: US 8,054,825 B2
(45) Date of Patent: Nov. 8, 2011

(54) METHOD FOR TRANSFERRING A CALL BETWEEN A TELECOMMUNICATIONS NETWORK AND A DATA NETWORK

(75) Inventors: Hartmut Weik, Stuttgart (DE); Johannes Schmechel, Eisingen (DE)

(73) Assignee: Alcatel Lucent, Paris (FR)

( * ) Notice: Subject to any disclaimer, the term of this patent is extended or adjusted under 35 U.S.C. 154(b) by 3449 days.

(21) Appl. No.: 10/217,427

(22) Filed: Aug. 14, 2002

(65) Prior Publication Data

US 2003/0035415 A1 Feb. 20, 2003

(30) Foreign Application Priority Data

Aug. 17, 2001 (EP) .................................... 01440267

(51) Int. Cl.
- H04L 12/66 (2006.01)
- H04L 12/28 (2006.01)
- H04J 3/16 (2006.01)

(52) U.S. Cl. ......... 370/352; 370/401; 370/466; 370/467
(58) Field of Classification Search .................. None
See application file for complete search history.

(56) References Cited

U.S. PATENT DOCUMENTS

| | | | | |
|---|---|---|---|---|
| 6,005,875 A * | 12/1999 | Lechner | ........................ | 370/524 |
| 6,259,691 B1 * | 7/2001 | Naudus | .......................... | 370/352 |
| 6,377,568 B1 * | 4/2002 | Kelly | ............................. | 370/352 |
| 6,625,269 B1 * | 9/2003 | Kim | ................................ | 379/156 |
| 6,760,323 B1 * | 7/2004 | Strandberg | ..................... | 370/352 |
| 6,782,004 B1 * | 8/2004 | Brusilovsky et al. | ......... | 370/467 |
| 7,046,683 B1 * | 5/2006 | Zhao | .............................. | 370/401 |
| 7,173,925 B1 * | 2/2007 | Dantu et al. | .................. | 370/352 |
| 2002/0024945 A1 * | 2/2002 | Civanlar et al. | ............... | 370/352 |
| 2003/0002512 A1 * | 1/2003 | Kalmanek et al. | ............ | 370/401 |
| 2003/0181194 A1 * | 9/2003 | Litvak et al. | .................. | 455/403 |
| 2004/0184446 A1 * | 9/2004 | Havens | ......................... | 370/352 |

FOREIGN PATENT DOCUMENTS

| | | |
|---|---|---|
| EP | 0581087 A1 | 2/1994 |
| WO | WO 0105108 A1 | 1/2001 |

* cited by examiner

Primary Examiner — Kwang B Yao
Assistant Examiner — Jutai Kao
(74) Attorney, Agent, or Firm — Sughrue Mion PLLC

(57) ABSTRACT

The invention relates to a method for transferring a call between a telecommunications network and a data network. Between the data network and the telecommunications network an internetwork computer (gateway) is arranged, by which voice data of the call is converted from a format used in the telecommunications network into a format used in the data network, and conversely. Signaling data of the call is processed by a data processing device arranged in the data network. In order to make full use of the available functions of a signaling channel in telecommunications networks, even with voice connections that are partially over a data network, it is proposed that the signaling data be transferred bit-transparently between the gateway and the data processing device.

14 Claims, 2 Drawing Sheets

METHOD FOR TRANSFERRING A CALL BETWEEN A TELECOMMUNICATIONS NETWORK AND A DATA NETWORK

BACKGROUND OF THE INVENTION

The invention is based on a priority application EP 01 440 267.1 which is hereby incorporated by reference.

The present invention relates to a method for transferring a call between a telecommunications network and a data network. Between the data network and the telecommunications network an internetwork computer is arranged, by which voice data of the call is converted from a format used in the telecommunications network into a format used in the data network, and conversely. Signalling data of the call is processed by a data processing device arranged in the data network.

The invention also relates to a data processing device of a data network that is connected to a telecommunications network through an internetwork computer.

Finally the present invention relates to an internetwork computer (so-called gateway) arranged between a telecommunications network and a data network. The gateway presents a means of converting voice data of a call from a format used in the telecommunications network into a format used in the data network, and conversely.

SUMMARY OF THE INVENTION

Methods and gateways of the kind initially mentioned are known from prior art for voice over IP (Internet Protocol) applications. In voice over IP applications, voice data of a call is transferred over telecommunications networks as well as over IP-based data networks. The telecommunications network is developed as a public telephone network (PSTN, Public Switched Telephone Network), for example. The data network can be developed as a LAN (Local Area Network), HFC (Hybrid Fibre Coaxial) network or a WLL (Wireless Local Loop) network, over which data can be transferred on the basis of an IP (Internet Protocol).

For voice over IP applications, telecommunication terminals for participants are connected to the data network through one or more gateways. The telecommunication terminals are for instance telephones or personal computers (PCs), which possess appropriate hardware and software. The data network is connected through another gateway to the telecommunications network. A data processing device is arranged in the data network. For a call incoming over the telecommunications network, the signaling data is converted by the gateway into commands, and the commands are transmitted to the data processing device. The data processing device causes a communications connection to be set up to the participant for whom the call is intended, over the IP-based data network. After the communications connection is set up, the gateway is responsible for converting the voice data of the call between the format used in the telecommunications network (e.g. TDM, Time Division Multiplex) and the format used in the data network (IP, Internet Protocol).

The signaling data of a call, which has been converted into commands by the gateway, is transferred over a signaling channel, which for example for ISDN is called the D channel. The signaling data is used for controlling the connection setup, for maintaining the connection and for controlled release of the connection. However, the functions provided by the signaling channel can only be fully utilized in the telecommunications network. In the voice over IP applications known from prior art, however, the functions of a signaling channel can barely be utilized. The cause of this is especially that before its transmission to the data processing device, the signaling data is converted into corresponding commands by the gateway. Also, the gateways known from prior art lead to a considerable implementation effort for the conversion of the signaling data into the commands.

The present invention is therefore based on the object of creating a simple possibility for making full use of the available functions of a signaling channel in telecommunications networks, even with voice connections that are partially over data networks.

To achieve this object, the present invention proposes, starting from the method of the kind initially mentioned for transferring a call, that the signaling data be transferred bit-transparently from the gateway to the data processing device, and be converted by this into corresponding control commands for the gateway, and the control commands be transferred to the gateway for controlling the connection element in the data network; or in the reverse direction, control commands be transferred from the gateway to the data processing device, converted by this into corresponding signaling data and the signaling data be transferred bit-transparently to the gateway for forwarding to the telecommunications network.

The data in the data network is preferably transferred with the Internet Protocol (IP). In the method according to the invention, the full functional range of a call's signaling data can be utilized. For this, the call's signaling data is transferred bit-transparently between the gateway and the data processing device. In a bit-transparent data transfer, in contrast to a command-, message- or packet-oriented data transfer, the transfer is executed bit by bit. Furthermore, when applying the method according to the invention, it is only necessary to adapt the data processing device to the formats or protocols used by the gateway, while the gateway itself need not be adapted. The gateways can therefore be implemented particularly simply.

The data processing device converts received signaling data into corresponding control commands for the gateway, which is arranged between the telecommunications network and the data network. The control commands are transferred to the gateway and executed by this to control the connection element in the data network.

In the reverse direction, control commands are transferred from the gateway to the data processing device, and converted by this into corresponding signaling data. The signaling data is transferred bit-transparently to the gateway for forwarding to the telecommunications network.

The data processing device is developed as a server, which is connected to the data network. The data processing device has the task of converting a call's signaling data, which is transferred bit-transparently with a first protocol from the gateway to the data processing device, into corresponding control commands, which are transferred with a second protocol to the gateway or the further gateway and there executed to control the connection element. The first protocol works for example according to the V5.2 standard (predominantly in Europe) or the GR303 standard (predominantly in the USA). The second protocol is e.g. developed as an MGCP or SIP, or works according to the H.323 standard. In addition, a number of other protocols are known from prior art, which can be used here as protocols.

According to an advantageous development of the present invention, it is proposed that status information be transferred across a network element control interface of the gateway to the data processing device. For this purpose a data transmission link, which is e.g. developed as an NMC (Network Management Console), is provided between the gateway and the data processing device. Over this data transmission link, synchronization information can e.g. be influenced for maintenance purposes. In a 2-Mbit communication system, for example, a channel 0 of a PCM30 interface can be influenced with the data transmission link. The current state of the connection setup or of an existing communications connection can be queried or influenced.

According to an advantageous development of the present invention, it is proposed that the signaling data of the call be converted by the data processing device into corresponding control commands for a further gateway, the further gateway being arranged between the data network and at least one telecommunication terminal, and the control commands being transferred to the further gateway for controlling the connection element in the data network, or conversely control commands being transferred from the further gateway to the data processing device, converted by this into corresponding signaling data and the signaling data being transferred bit-transparently to the gateway for forwarding to the telecommunications network. Telecommunication terminals are connected to the data network through the further gateway. The telecommunication terminals can be developed as telephones or as computers, in particular as personal computers, which are equipped with appropriate hardware and software. According to this development, the signaling data is thus converted on one hand into control commands for the gateway between the telecommunications network and the data network, and on the other hand also into control commands for the further gateway. The gateway and the further gateway execute the control commands to control the connection element in the data network.

It is proposed that the control commands for the gateway or the further gateway be transferred with one of the following protocols: MGCP (Media Gateway Control Protocol), SIP (Session Initiation Protocol) or a protocol according to the H.323 standard. The control commands are preferably transferred over the data network to the gateway or the further gateway.

As a further way of achieving the object of the present invention it is proposed, starting from the data processing device of a data network of the kind initially mentioned, that the data processing device should present the means to receive bit-transparently transferred signaling data of a call coming from the telecommunications network, means to convert the signaling data into corresponding control commands for the gateway and means to transfer the control commands to the gateway for controlling the connection element in the data network. For bit-transparent data transfer in the reverse direction, the data processing device presents the means to receive control commands from the gateway, means to convert the control commands into corresponding signaling data and means for bit-transparent transfer of the signaling data to the gateway for forwarding to the telecommunications network.

Self-evidently, the data processing device can not only convert signaling data into corresponding control commands, but conversely also convert control commands into corresponding signaling data, which is transferred to the gateway, and is forwarded to a switching center in the telecommunications network and executed there for controlling the connection element in the telecommunications network.

According to an advantageous development of the present invention, it is proposed that the data processing device should present the means for converting the signaling data into corresponding control commands for a further gateway, which is arranged between the data network and at least one telecommunication terminal, and means for transferring the control commands to the further gateway for controlling the connection element in the data network, or means for transferring control commands from the further gateway to the data processing device, means for converting the control commands into corresponding signaling data, and means for bit-transparent transfer of the signaling data to the gateway for forwarding to the telecommunications network.

According to a preferred embodiment of the present invention, it is proposed that the data processing device present means of carrying out the method according to the invention.

As yet another way of achieving the object of the present invention it is proposed, starting from the gateway of the kind initially mentioned, arranged between a telecommunications network and a data network, that the gateway should present the means for bit-transparent transfer of signaling data of the call to a data processing device of the data network, means for receiving control commands corresponding to the signaling data from the data processing device, and means for executing the control commands to control the connection element in the data network. For the bit-transparent data transfer in the reverse direction, the gateway has the means for transferring control commands to the data processing device, means for receiving bit-transparently transferred signaling data corresponding to the control commands, and means for forwarding the signaling data to the telecommunications network.

According to an advantageous development of the present invention, it is proposed that the gateway present means of compressing and/or decompressing the signaling data. In the data processing device, corresponding means are present for decompressing or compressing the signaling data.

According to a preferred embodiment of the present invention, it is proposed that the gateway present means of transferring status information across a network element control interface of the gateway to the data processing device. As a means of transferring the status information, a data transmission link can e.g. be provided, which is developed as an NMC (Network Management Console).

According to a further preferred embodiment of the present invention, it is proposed that the gateway be linked over an E1 interface with a V5.2 communication channel with the telecommunications network. It is alternatively proposed that the gateway be linked over an E1 interface with a D communication channel with the telecommunications network. Advantageously, the gateway has the means of carrying out the method according to the invention.

BRIEF DESCRIPTION OF THE DRAWINGS

Further features, possibilities of application and advantages of the invention will emerge from the description that follows of embodiments of the invention, which are shown in the drawing. Here, all described or presented features alone or in any combination form the subject matter of the invention, irrespective of their summary in the claims or their relations, and irrespective of their formulation or presentation in the description or drawing respectively. Shown are:

In FIG. 1 are shown several telecommunication terminals, which are developed e.g. as telephones 1 or as a personal computer (PC) 2. The telecommunication terminals 1, 2 are connected through a gateway (Residential Gateway) 3, to an IP(Internet Protocol)-based data network 4. Also connected to the data network 4 are a gateway (UAG, Universal Access Gateway) 5 and a data processing device (ACA, Access Call Agent) 6.

Figure 1:
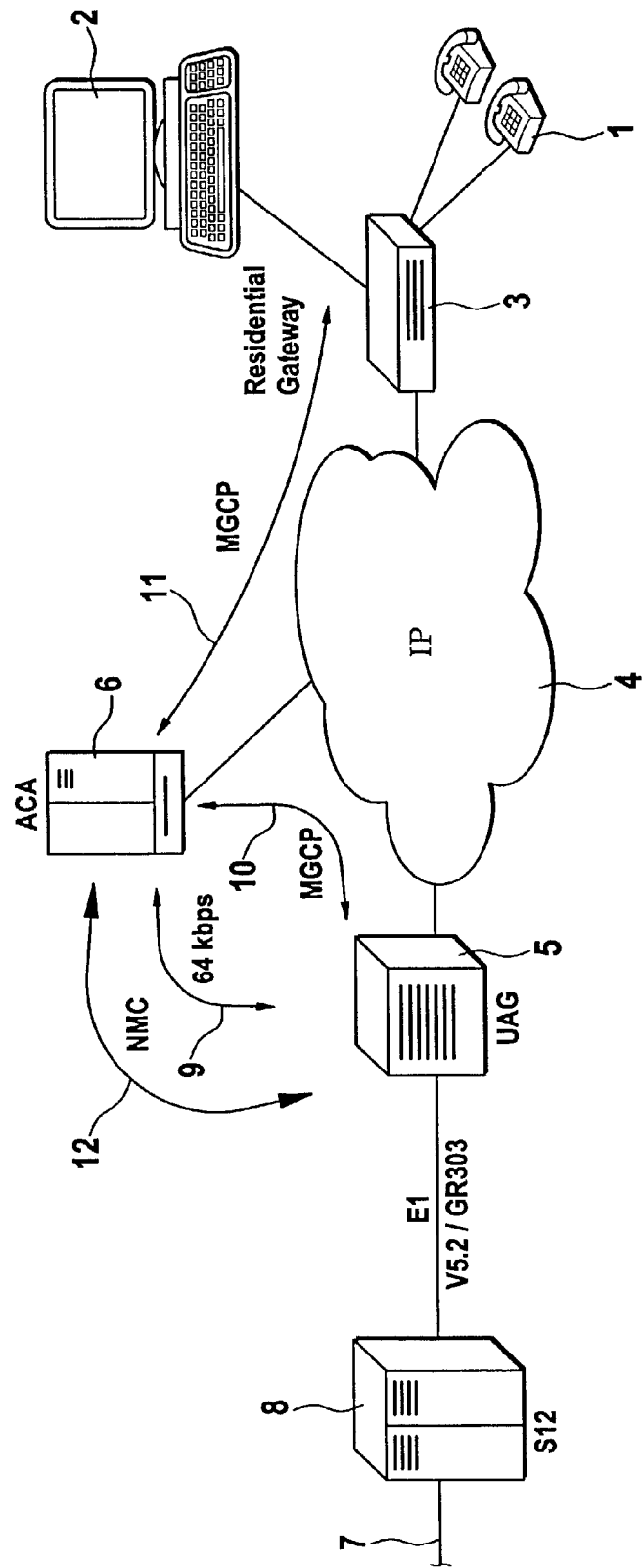
FIG. 1 a network structure for executing a method according to the invention according to a preferred embodiment.

The gateway 5 is furthermore connected to a switching center 8 identified as S12, which is part of a telecommunications network 7. The telecommunications network 7 is developed as a public telephone network (PSTN, Public Switched Telephone Network), for example. The switching center 8 is linked over an E1 interface with a V5.2 communication channel with the gateway 5. Alternatively, the switching center 8 can also be connected with the gateway 5 over an E1 interface with a GR303 communication channel.

The IP-based data network 4 can be developed as a local area network (LAN), as a hybrid fibre coaxial (HFC) network or as a wireless local loop (WLL) network. All these networks supply a data connection over which voice signals can be transferred.

Protocols such as SIP (Session Initiation Protocol) or MGCP (Media Gateway Control Protocol) or a protocol according to the H.323 standard or similar are used in the gateway 3.

Voice over IP (Internet Protocol) applications can be implemented with the help of the network structure shown in FIG. 1. In this case, voice signals of a call are transferred not only over the telecommunications network 7, but also over the IP-based data network 4.

For voice over IP applications, in order to be able to use as many as possible of the telephony service features that are supplied in a pure telecommunications network 7 over a signaling channel, the method according to the invention is proposed for transfer of a call between the telecommunications network 7 and the data network 4. The telephony service features are implemented through the switching center 8, which is connected over the E1 interface to the gateway 5.

The essential part of the method according to the invention is executed in the data processing device 6. For a call incoming from the telecommunications network 7, the data processing device 6 switches through a connection to a participant terminal device 1 or 2 connected to the gateway 3. To do so, the data processing device 6 evaluates the call attempt incoming over the V5.2 communication channel and, using the Media Gateway Control Protocol (MGCP), outputs control commands to the gateway 5 and the gateway 3, to control the connection element of the voice connection, which is implemented through the IP-based data network 4. The control of the connection element covers the setting up, maintenance and termination of a connection.

The signaling data is transferred over a 64-kbit/sec data connection 9 from the gateway 5 to the data processing device 6. The control commands are transferred over a connection 10 from the data processing device 6 to the gateway 5, and over a connection 11 to the gateway 3. The connections 10 and 11 are e.g. implemented through the IP-based data network 4. The data processing device 6 furthermore generates a V5.2 64-kbit/sec data stream, which is transferred via the gateway 5 to the switching center 8, for activating the switching center 8.

At the same time the data processing device 6 receives and sends status information over a further connection 12 across a network element control interface of the gateway 5, in order to be able to set or evaluate codes (so-called flags) conforming to the required V5.2 standard in a channel 0 of the corresponding V5.2 interfaces too. Seen from the switching center 8, the data network 4 looks like a conventional access network, which has a V5.2 or GR303 interface.

In the data processing device 6 an assignment list is provided, which holds call numbers of participants and corresponding IP addresses under which the participants or the corresponding telecommunication terminals 1, 2 can be reached.

Figure 2:
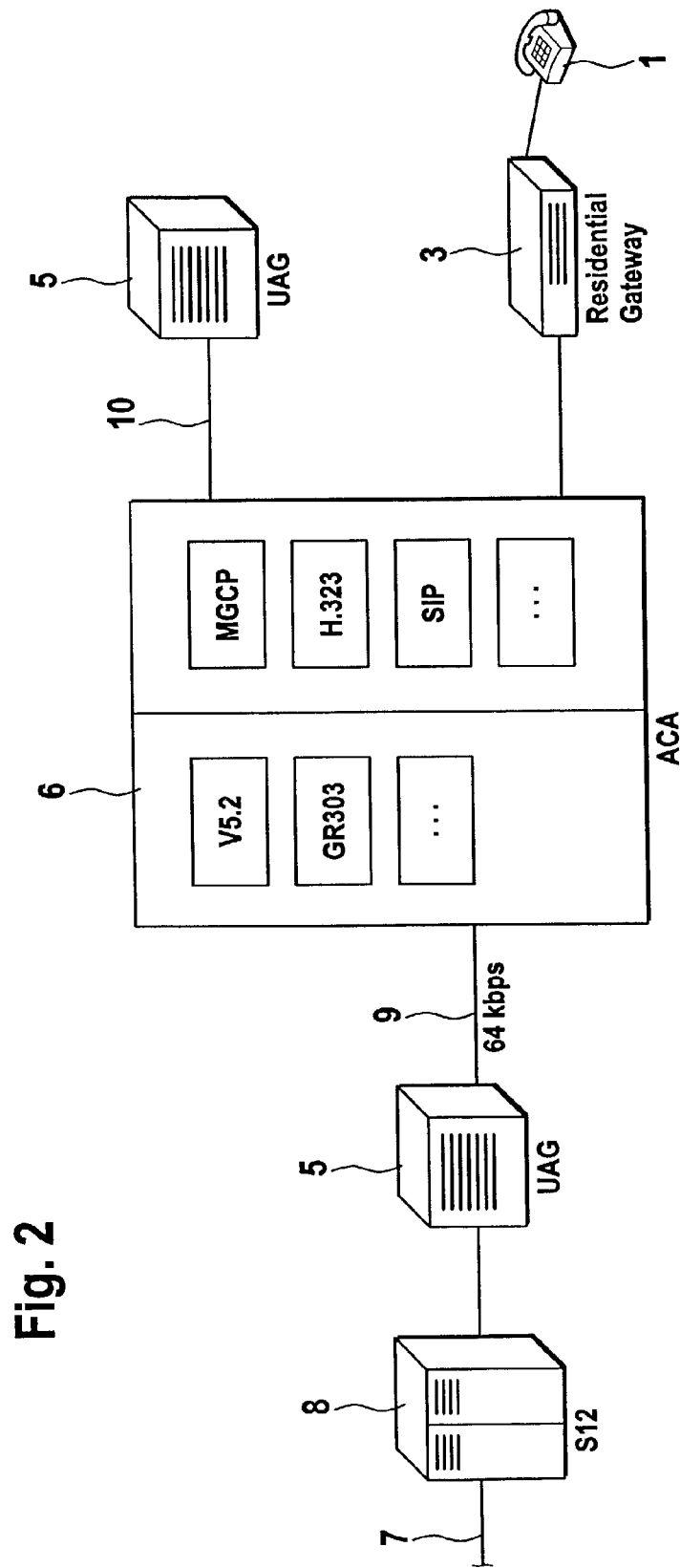
FIG. 2 a data processing device according to the invention according to a preferred embodiment with its connections to the other components of the network structure from FIG. 1.

With reference to FIG. 2, the function of the data processing device 6 will be elucidated once more. When a call is to be transferred from the telecommunications network 7 to the data network 4, the data processing device 6 is responsible for the control of the connection element including the setting up of a connection through the IP-based data network 4. This is achieved by converting the signaling data of a call into corresponding control commands and transferring it using any protocol (MGCP, SIP, protocol according to the H.323 standard or similar) to the gateways 3, 5. When a call is to be transferred from the data network 4 to the telecommunications network 7, the data processing device 6 is responsible for the control of the connection element including the setting up of a connection through the telecommunications network 7. This is achieved in that the data processing device 6 generates corresponding signaling data from commands from the gateways 3, 5, and this is written to a signaling channel e.g. of a V5.2 interface or a GR303 interface.

In addition, the data processing device 6 has an access 12 to the network control (so-called Network Element Management), to enable it to control the IP-based connection element. Thus an essential task of the data processing device 6 is to convert signaling data from the telecommunications network 7, being transferred with a first protocol (e.g. V5.2, GR303 or similar) to the data processing device 6, into corresponding control commands, which are transferred with a second protocol (MGCP, SIP, protocol according to the H.323 standard or similar) to the gateways 3, 5; or to convert control commands from the gateways 3, 5 into corresponding signaling data.

The invention claimed is:

1. A method for transferring a call between a telecommunications network and a data network, a gateway being arranged between the data network and the telecommunications network, the method comprising:
    converting voice data of the call from a format used in the telecommunications network into a format used in the data network;
    processing signaling data of the call by a data processing device arranged in the data network, wherein the signaling data is transferred bit-transparently from the gateway to the data processing device and converted by the data processing device into corresponding control commands for the gateway;
    transferring the control commands to the gateway for controlling the connection element in the data network, or transferring the control commands from the gateway to the data processing device and the data processing device converting the control commands into corresponding signaling data; and
    transferring the signaling data bit-transparently to the gateway for forwarding to the telecommunications network.

2. The method as claimed in claim 1, wherein status information is transferred over a network element control interface of the gateway to the data processing device.

3. The method as claimed in claim 1, wherein the signaling data of the call is converted by the data processing device into corresponding control commands for a further gateway, the further gateway being arranged between the data network and at least one telecommunication terminal, and the control commands being transferred to the further gateway for controlling the connection element in the data network, or control commands being transferred from the further gateway to the data processing device and converted by the data processing device into corresponding signaling data, and the signaling data being transferred bit-transparently to the gateway for forwarding to the telecommunications network.

4. The method as claimed in claim 1, wherein the data in the data network is transferred with the Internet Protocol.

5. A data recessing device of a data network, which is connected to a telecommunications network through a gateway computer, the data processing device comprising:
   means for receiving bit-transparently transferred signaling data of a call incoming through the telecommunications network;
   means for converting the signaling data into corresponding control commands for the gateway;
   means for transferring the control commands to the gateway for controlling the connection element in the data network;
   means for receiving control commands from the gateway;
   means for converting the control commands into corresponding signaling data; and
   means for bit-transparent transfer of the signaling data to the gateway for forwarding to the telecommunications network.

6. The data processing device as claimed in claim 5, further comprising:
   means for converting the signaling data into corresponding control commands for a further gateway, which is arranged between the data network and at least one telecommunication terminal;
   means for transferring the control commands to the further gateway for controlling the connection element in the data network;
   means for transferring control commands from the further gateway to the data processing device;
   means for converting the control commands into corresponding signaling data; and
   means for bit-transparent transfer of the signaling data to the gateway for forwarding to the telecommunications network.

7. The data processing device as claimed in claim 5, wherein the data processing device presents means for compressing and decompressing the signaling data.

8. The processing device as claimed in claim 5, further comprising:
   means for carrying out a method for transferring a call between a telecommunications network and a data network, a gateway being arranged between the data network and the telecommunications network, through which gateway voice data of the call is converted from a format used in the telecommunications network into a format used in the data network, and signaling data of the call being processed by a data processing device arranged in the data network, wherein the signaling data is transferred bit-transparently from the gateway to the data processing device and converted by the data processing device into corresponding control commands for the gateway and the control commands are transferred to the gateway for controlling the connection element in the data network, or control commands are transferred from the gateway to the data processing device and converted by the data processing device into corresponding signaling data, and the signaling data is transferred bit-transparently to the gateway for forwarding to the telecommunications network.

9. A gateway arranged between a telecommunications network and a data network, the gateway comprising:
   means for converting voice data of a call from a format used in the telecommunications network into a format used in the data network;
   means for bit-transparent transfer of signaling data of the call to a data processing device of the data network;
   means for receiving control commands corresponding to the signaling data from the data processing device;
   means for executing the control commands for controlling the connection element in the data network;
   means for transferring control commands to the data processing device;
   means for receiving bit-transparently transferred signaling data corresponding to the control commands; and
   means for forwarding the signaling data to the telecommunications network.

10. The gateway as claimed in claim 9, further comprising means for compressing and decompressing the signaling data.

11. The gateway as claimed in claim 9, further comprising means for transferring status information across a network element control interface of the gateway to the data processing device.

12. The gateway as claimed in claim 9, wherein the gateway is connected over an E1 interface with a V5.2 communication channel with the telecommunications network.

13. The gateway as claimed in claim 9, wherein the gateway is connected over an E1 interface with a D communication channel with the telecommunications network.

14. The gateway as claimed in claim 9, further comprising:
   means for carrying out .a method for transferring a call between a telecommunications network and a data network, a gateway being arranged between the data network and the telecommunications network, through which gateway voice data of the call is converted from a format used in the telecommunications network into a format used in the data network, and signaling data of the call being processed by a data processing device arranged in the data network, wherein the signaling data is transferred bit-transparently from the gateway to the data processing device and converted by the data processing device into corresponding control commands for the gateway and the control commands are transferred to the gateway for controlling the connection element in the data network, or control commands are transferred from the gateway to the data processing device and converted by the data processing device into corresponding signaling data, and the signaling data is transferred bit-transparently to the gateway for forwarding to the telecommunications network.

* * * * *